(12) United States Patent
Miller

(10) Patent No.: US 6,442,481 B2
(45) Date of Patent: Aug. 27, 2002

(54) SECOND ORDER COMPLEMENTARY GLOBAL POSITIONING SYSTEM/INERTIAL NAVIGATION SYSTEM BLENDING FILTER

(75) Inventor: Ronald J. Miller, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/885,621

(22) Filed: Jun. 20, 2001

Related U.S. Application Data

(60) Provisional application No. 60/221,314, filed on Jul. 28, 2000.

(51) Int. Cl.$^7$ .............................................. H01C 21/00
(52) U.S. Cl. .................... 701/214; 701/216; 342/357.14
(58) Field of Search ................................ 701/214, 216, 701/217, 220; 342/357.14

(56) References Cited

U.S. PATENT DOCUMENTS

| | | | | |
|---|---|---|---|---|
| 5,583,774 A | * | 12/1996 | Diesel ......................... 701/200 |
| 5,740,048 A | | 4/1998 | Abel et al. ................... 364/443 |
| 5,760,737 A | | 6/1998 | Brenner ....................... 342/357 |
| 5,923,286 A | | 7/1999 | Divakaruni .................. 342/357 |
| 5,969,668 A | | 10/1999 | Young, Jr. .................... 342/357 |
| 6,037,893 A | * | 3/2000 | Lipman ........................ 342/184 |
| 6,178,379 B1 | | 1/2001 | Dwyer ........................ 701/205 |
| 6,205,400 B1 | | 3/2001 | Lin ............................. 701/214 |
| 6,271,789 B1 | * | 8/2001 | Beerhold ............... 342/357.14 |
| 6,292,750 B1 | * | 9/2001 | Lin ........................ 342/357.01 |

* cited by examiner

Primary Examiner—Tan Nguyen
(74) Attorney, Agent, or Firm—Loria B. Yeadon

(57) ABSTRACT

A second-order filter that blends accurate position information from a one source, and velocity information from another source, both suitably scaled, in a second-order complementary filter. The filter is arranged such that an internal integrator maintains a value that represents the difference in the rate of change of the accurate position information, and the velocity input of the other source. This velocity difference is applied to another integrator outside the filter, whose initial condition is the position error between the two sources to the second order filter. The output of this latter integrator is a correction signal that grows at a rate equal and opposite to the rate of error build-up of position data from the source whose velocity is used in the second order filter. This correction signal is summed with the original position signal. In addition, the output of the second order filter may be used as a highly accurate position signal.

13 Claims, 2 Drawing Sheets

SECOND ORDER COMPLEMENTARY GLOBAL POSITIONING SYSTEM/INERTIAL NAVIGATION SYSTEM BLENDING FILTER

CROSS-REFERENCE TO RELATED APPLICATIONS

This application claims priority to Provisional Application, Ser. No. 60/ 221,314, filed Jul. 28, 2000.

BACKGROUND OF THE INVENTION

1. Field of the Invention (Technical Field)

This invention relates to navigation systems, and, in particular, airborne navigation and guidance systems utilizing the computation of position and velocity for automatic guidance.

2. Background Art

Modern navigation systems utilize extremely accurate signals from a constellation of satellites that comprise the Global Positioning System (GPS) to compute position. However, while such signals provide excellent long-term position accuracy, they are noisy in the short-term. This is particularly true of the velocity data provided. Velocity data as well as position data is required to provide smooth, stable guidance. A further disadvantage of GPS is that the data rate of the position solution is lower than desirable for smooth, stable aircraft guidance.

Current practice is to augment the GPS signals with signals from Inertial Navigation Systems (INS). Present day commercial systems compute the difference between unfiltered INS position, and unfiltered GPS position, and then filter the correction signal in a second order lag (not complementary) filter before applying it to the INS. The computational complexity of such approaches is equivalent to the instant invention, but provides none of the advantages. The INS signals exhibit excellent short-term accuracy and smoothness, but they suffer from long-term drift that produces position errors that are unbounded with time. By blending the GPS and INS signals, a blend can be produced that exhibits the best characteristics of each. Not only is accurate position data produced, but also, velocity data that is smooth. Further, the velocity data can be used to "fill" the position data between GPS position updates. The accurate position data can be used to correct the INS data from long term-drift as well.

A common, albeit complicated, method to accomplish the blending of GPS and INS data that also corrects the INS long term drift is the Kalman Filter. Such a filter can correct both drift and drift rate of an INS, but requires a very powerful digital computer to provide acceptable data rates for smooth, stable guidance.

The current invention provides both smooth long-term and short-term signals whose quality and data rate are high enough to be used for guidance, and provides signals to correct INS drift and drift rate. However, it is simple and straightforward to implement, and does not require a powerful computer in order to provide the necessary functionality and update rate for guidance. In fact, it could be implemented in an analog computer.

The two means of solving the problem are Kalman Filters, and "lag" filters. The former are used commonly in Military systems, (for instance the C-141C GPS Enhanced Navigation System or GPSENS) while the latter are used in Commercial systems such as Honeywell's Flight Management System for the Boeing 757, 767, and 777 aircraft.

The Kalman filter is the standard solution to the problem of providing blended GPS and INS data for use in guidance systems while also providing correction signals for the INS drift and drift rate. However, it requires a powerful computer to produce acceptable data rates, or its output must be augmented in other ways to be acceptable for use in guidance systems. This prior art solution is very costly and complex. Kalman filters may solve the problem of correcting the INS data for drift and drift rate, but that is not necessarily their primary purpose. Kalman filters combine signals from a multiplicity of sources, in an effort to produce an output that is statistically more accurate than any of the inputs.

Commercial systems use lag filters to eliminate noise from the GPS position information so that it can be used to correct the INS information that is used for guidance. However, such filters cannot provide correction for INS drift rate, and may limit the effectiveness of the guidance system in which they are used.

Prior art is concerned with using a simple second order filter (Not complementary) to determine the magnitude, velocity, or acceleration of the error between two sensor signals (1), or optimizing the blending of signals at the "raw" measurement level, using a plurality of measurements to determine the integrity of any single measurement in a conventional (2–5) or Kalman filter Kalman (6). None of the prior art used position from GPS and both position and velocity from INS to correct errors in both the position and velocity output of an INS as used in the present invention.

Other devices are similar in that they utilize both velocity and position data in combination to provide smooth output signal. However, such filters to not use the velocity error that may be available in such devices to correct for drift rate of the INS. For an example, see the Radio/INS filter that is used in the C-141C Navigation subsystem as shown in FIG. 1.

The current invention improves on the prior art in that it inherently compensates for errors in the velocity input as it uses the velocity data in the blended output. It therefore corrects both position and velocity errors using signal from a single filter.

SUMMARY OF THE INVENTION (DISCLOSURE OF THE INVENTION)

In accordance with the present invention, disclosed is a second order complementary filter for correcting position errors and velocity errors in an inertial navigation system (INS). The preferred second order complementary filter for correcting position errors and velocity errors in an inertial navigation system comprises a blending filter for blending a position signal from a first navigation source with a velocity signal from a second navigation source, structure for generating an output from the blending filter comprising a rate of change of position error of the first navigation source from the second navigation source, an integrator for inputting the rate of change of position error when the first navigation source becomes invalid and outputting a dynamic position error signal and an apparatus for summing the dynamic position error signal and an inertial navigation system position signal to output a dynamically corrected inertial navigation system position. The first navigation source preferably comprises a global positioning system and the second navigation source comprises the INS. The preferred integrator comprises an INS correction loop for continuous compensation for an INS drift rate when the first navigation source becomes invalid. The preferred invention further comprises a switch for rendering the correction loop operational when the first navigation source becomes invalid. The preferred switch further comprises a hold position for making the output of the integrator constant.

The preferred method of correcting position and velocity errors with a second order complementary filter in an inertial navigation system comprises the steps of blending a position signal from a first navigation source with a velocity signal from a second navigation source with blending filter, generating an output from the blending filter comprising a rate of change of position error of the first navigation source from the second navigation source, creating a position correction signal from the generated output and applying the corrected signal to the inertial navigation system. The preferred method further comprises the step of continuously repeating the aforementioned steps. The preferred method further comprises the step of capturing a last value of position error when the first navigation source becomes invalid. The preferred method further comprises the step of switching the second order complimentary filter on when the first navigation source becomes invalid. The preferred step of switching further comprises placing the second order complimentary filter on hold so that the generated output is constant.

An alternative apparatus comprises a second order complementary filter for correcting position errors and velocity errors in an inertial navigation system (INS) comprising a blending filter for blending a position signal from a first navigation source with an inertial navigation velocity signal from a second navigation source, structure for generating a dynamic error signal from the blending filter comprising a rate of change of position error of the first navigation source from the second navigation source, an apparatus for disconnecting a position input and a position feedback from the blending filter when the input position signal becomes invalid, an apparatus for summing the dynamic error signal and the inertial navigation system velocity signal to produce a dynamically corrected inertial navigation system velocity signal and an apparatus for integrating the inertial navigation velocity signal to produce a corrected inertial navigation system position signal. The first navigation source preferably comprises a global positioning system and the second navigation source comprises the INS. The apparatus for integrating is preferably part of the second order complementary filter.

A primary object of the present invention is to blend GPS and INS signals for correction of drift and drift rate errors.

Another object of the present invention is to provide a second order complementary filter to determine drift rate of an INS, and the use of this drift rate to improve the correction to the position error of the INS.

Another object of the present invention is to provide a second order complementary filter or correct an INS velocity signal so that this corrected velocity signal can be used to compute accurate position information in the presence of momentary interruption of GPS.

Another object of the present invention is to provide smoothed position and velocity information of suitable dynamic fidelity to be used in a stable. accurate guidance system in an aircraft.

A primary advantage of the present invention is that it is simple and inexpensive compared to prior art methods which are complicated and expensive and do not satisfy all the needs that the present invention satisfies.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Disclosed is an apparatus and method that uses a second order complementary filter to determine drift rate of an INS, and the use of this drift rate to improve the correction to the position error of the INS. Also disclosed is the use of a second order complementary filter to correct an INS velocity signal so that this corrected velocity signal can be used to compute accurate position information in the presence of momentary interruption of GPS.

Figure 1:
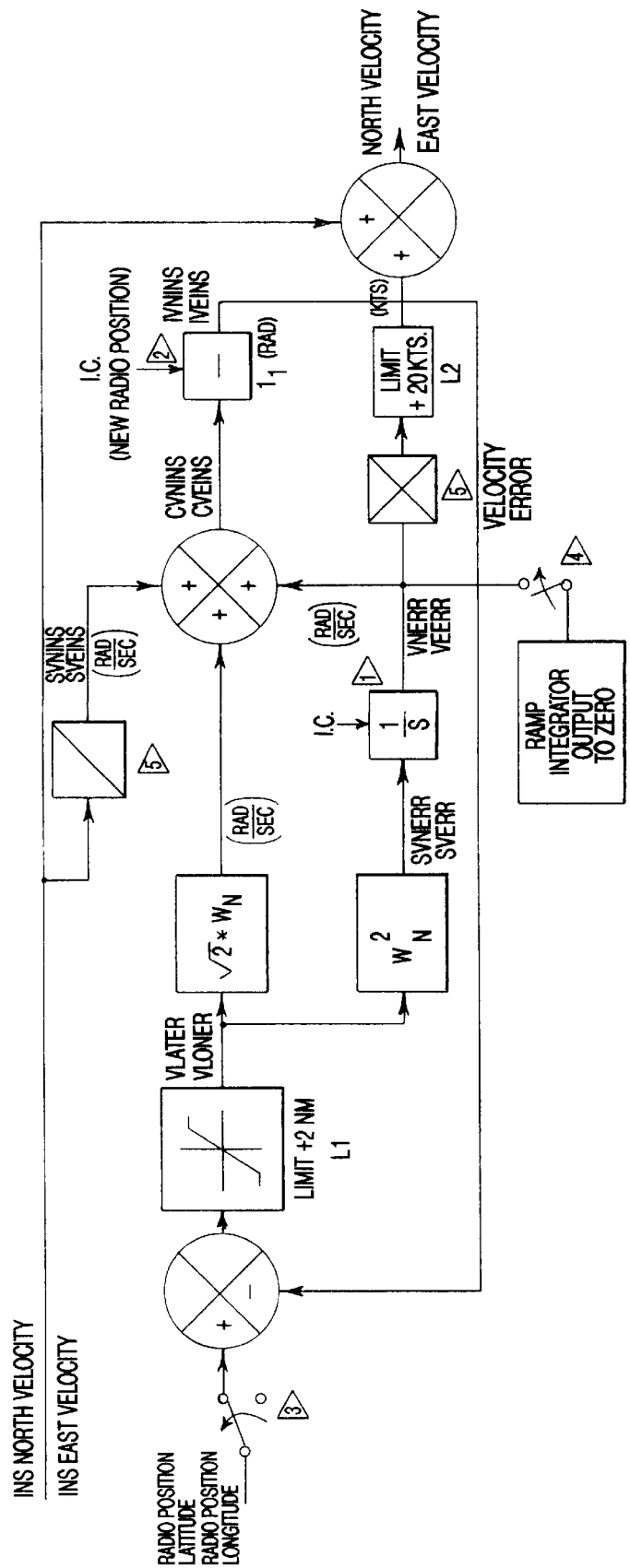
FIG. 1 is a schematic of one prior art embodiment.
Figure 2:
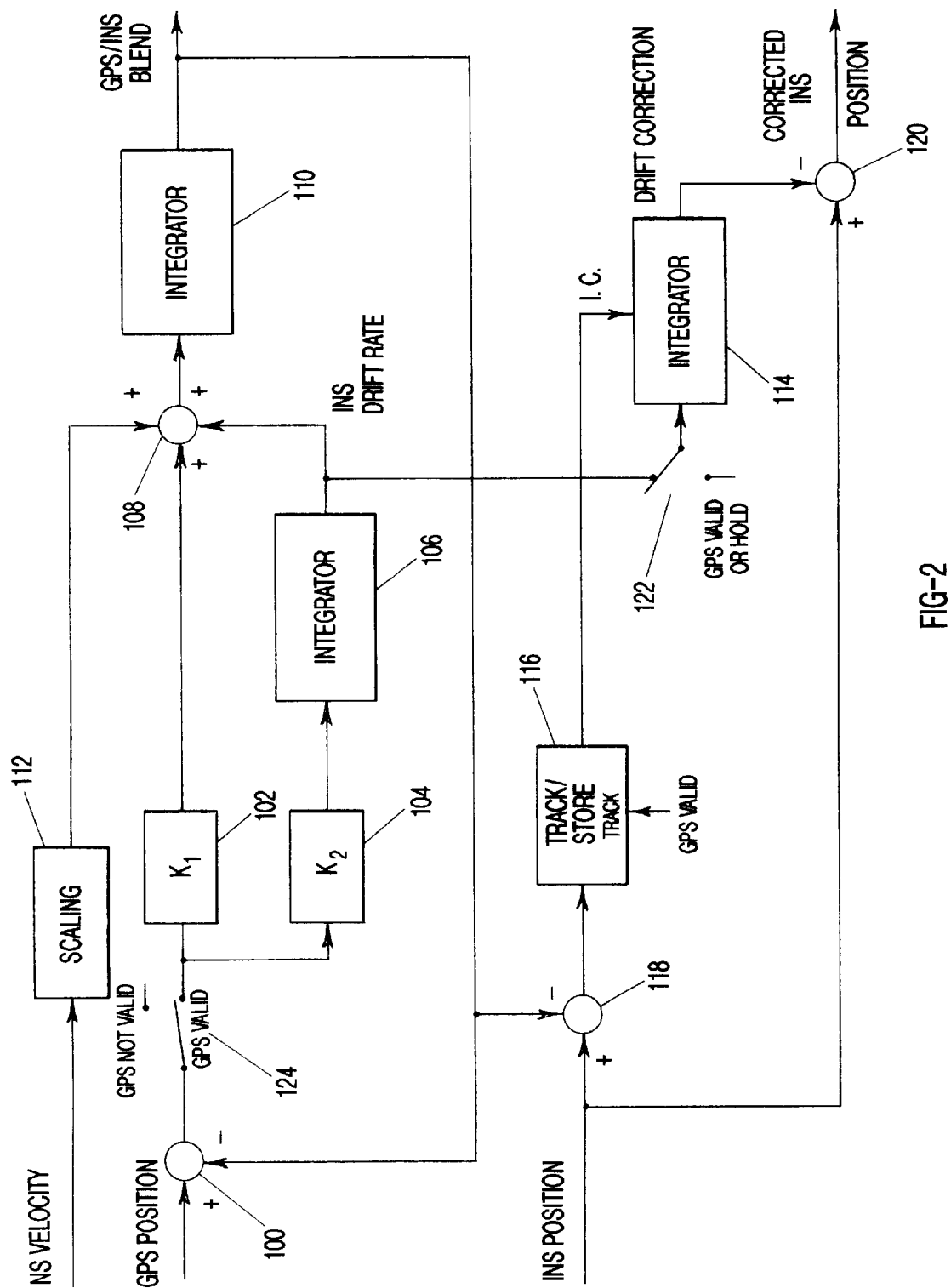
FIG. 2 is a block diagram showing the preferred embodiment of the invention.

As shown in FIG. 2, the preferred embodiment comprises a second order complementary filter made up from integrators 106 and 110, gain blocks 102 and 104, summing junctions 100 and 108, and scaling block 112; an INS correction "loop" consisting of summing junctions 118 and 120, a Track/Store function 116, and an integrator 114; and switches 122 and 124.

Note that the embodiment shown in FIG. 2 represents one of several essential filters used to smooth position and velocity information and to correct for position and velocity errors in an inertial navigation system. The position information may be expressed in units of latitude and longitude, in which case two such filters would be used (one for latitude, and north/south velocity, and one for longitude and east/west velocity). Other implementations would be utilized to operate in other units, such as Earth-centered, earth-fixed (ECEF). In any such system of units, there would be one such filter for each dimension (for example, X, Y, Z, and their respective rates of change).

The preferred second order complementary filter blends INS velocity information with GPS position information to produce smooth, noise free position information without any dynamic lags or time delays, and that produces a signal indicative of the error in the INS velocity.

The INS correction loop that incorporates an integrator whose Initial Condition (I. C.) is the stored value of the error between GPS and INS position, and whose input is the drift rate (velocity error) of the INS, such that the output of the integrator is a bias correction to the INS that changes at the rate of the INS velocity error so that a position correction that continues to compensate for INS drift rate can be applied to the INS even if there is a loss of the GPS position.

The second-order complementary filter consists of a first summing junction 100 whose output is the difference between the input position from the GPS and the position output of the filter. The output of this summing junction is applied to gain elements 102 and 104 through switch 124. Switch 124 is closed whenever the data from the GPS is valid, thereby rendering the second-order complementary loop operational. The output of gain element 102 is a signal that is $K_1$ times the position difference. The output of gain element 104 is $K_2$ times the position difference, and it is applied to the input to integrator 106. The output of integrator 106 is the time integral of $k_2$ times the position difference. Summing junction 108 takes the sum of the output of integrator 106, gain element $K_1$, and scaling element 112. The input to scaling element 112 is velocity signal produced by the INS. The scaling element converts the velocity scaling from that of the INS to that of the filter. For instance, if the filter is processing latitude from the GPS scaled in radians, the INS north/south velocity output is applied to the filter through scaling element 112. This scaling element would convert the north south velocity from nautical miles per hour; for example, to radians per second if the latitude processed by the filter is scaled in radians. It does this by dividing by the radius of the earth, and again by 3600 seconds per hour. (This is an example only; other scalings could be used.)

It is this consistent scaling of the INS velocity signal with the position data being processed in the filter that makes it a "complementary" filter. If the velocity from the INS were perfectly accurate, it represents the rate of change of perfectly accurate position, and is, therefore, said to complement the position data.

The output of summing junction is applied as the input to integrator 110. The output of integrator is a filtered, smoothed position. Because the filter is a second order filter, the position error output of summing junction 100 remains at zero in steady, unaccelerated flight. The input to integrator 110 represents the true rate of change of smoothed filtered position, and is the sum of INS velocity, and the output of integrator 106, since, at steady state, the output of gain element 102 is zero. Therefore, since the filter is stable, the steady state value of the output of integrator 106 must be a value that is equal and opposite to the value of any error in the scaled velocity data that is applied to summing junction 108. Because the INS position output is the time integral of the INS velocity, output of integrator 106 represents a value that is equal and opposite to the drift rate of the INS. This signal, therefore, represents the rate of growth in the position error of the INS.

Summing junction 118 takes the difference between the INS position signal, and the highly accurate, smoothed position output signal from the second order filter. The output of this summing junction 118 is therefore the position error of the INS. The output of summing junction 118 is applied to the Track Store element 116. As long as the GPS data is valid, element 116 tracks the error signal. If the GPS data becomes invalid for any reason, element 116 "captures" the last value of the position error. The output of element 116 is applied to integrator 114 as its initial condition. The output of integrator 106 is applied to the input of integrator 114 through switch 122. As long as the GPS signal is valid, integrator 114 has no input (cannot integrate) and its initial condition is constantly "tracking" the error between the INS and the highly accurate filter output. If the GPS signal becomes invalid, the output of integrator 106, the rate of growth in INS position error, is applied to integrator 114. The output of integrator 114 is, therefore, a signal that initially represents the position error in the INS signal at the time that the GPS became invalid, and which grows at the rate at which the INS position error was growing at the time that the GPS became invalid. This signal is summed with the INS position signal in summing junction 120. The output of summing junction 120 is a signal that represents the INS position that not only is corrected for accumulated position error, but also, continues to be corrected for the rate of change of position error.

The rate of change in the position error of an INS is not a constant. It consists of components from various sources, and is affected by maneuvering of the aircraft. Therefore, after some time without valid GPS data to update the position error, and drift rate of the INS, the drift rate output of integrator 106 may no longer be considered to be accurate. For this reason, switch 122 must be switched to the "HOLD" position so that the integration of drift rate ceases, and the output of integrator 114 is constant. This output can continue to be applied to summing junction 120 as the last, best estimate, of error in the INS position data. If GPS data continues to be unavailable, the INS position would be subject to further drift errors since no updates to the correction bias (the output of integrator 114) would be available.

Thus there are two position signals provided by this arrangement. One is the smooth, accurate output of integrator 110. The other is the corrected INS position that is the output of summing junction 120. As long as the GPS position data is valid, the system that is using the position data would select the former. However, if the GPS signal becomes invalid, the using system could select the corrected INS output of summing junction 120. Initially, there would be essentially no loss of accuracy. However, in time, switch 122 would interrupt the input to integrator 114. The corrected INS output would continue to have the advantage of the best correction available for the INS position signal.

The nature of GPS is such that it may be interrupted momentarily due to satellites coming into view, or passing from view, or because of "masking" of one or several satellite signals as the aircraft maneuvers. For such momentary interruptions, it is not necessary for the using system to switch between the GPS/INS Blend output and the corrected INS output.

When GPS data is momentarily invalid, switch 124 opens. Under this condition, the input to integrator 106 is zero, and its output remains constant at the accumulated value of the error in the INS velocity signal. Thus, the input to integrator 110 is effectively the INS velocity, corrected by the filter. Therefore, the output of integrator 110 continues to be smooth, accurate position. It is the integral of corrected INS velocity.

A significant alternative is to extend the time that the second order filter could operate in the absence of GPS data. In this embodiment, the quality of integrator 110 is increased, and it can be used for longer term integration of the corrected INS velocity. In the extreme case, the INS correction loop can be eliminated, and the output of integrator 110 represents GPS/INS blended, accurate position when GPS is valid. This output represents corrected INS position when switch 124 is opened in that it would be the integral of corrected INS velocity, starting with the initial condition of accurate GPS/INS blend at the time that GPS data becomes invalid.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A second order complementary filter for correcting position errors and velocity errors in an inertial navigation system (INS) comprising:
   a blending filter for blending a position signal from a first navigation source with a velocity signal from a second navigation source;
   a means for generating an output from the blending filter comprising a rate of change of position error of the first navigation source from the second navigation source;
   an integrator for inputting the rate of change of position error when the first navigation source becomes invalid and outputting a dynamic position error signal; and
   a means for summing said dynamic position error signal and an inertial navigation system position signal to output a dynamically corrected inertial navigation system position.

2. The invention of claim 1 wherein said first navigation source comprises a global positioning system and said second navigation source comprises the INS.

3. The invention of claim 1 wherein said integrator comprises an INS correction loop for continuous compensation for an INS drift rate when the first navigation source becomes invalid.

4. The invention of claim 3 further comprising a switch for rendering the correction loop operational when the first navigation source becomes invalid.

5. The invention of claim 3 wherein said switch further comprises a hold position for making the output of said integrator constant.

6. A method of correcting position and velocity errors with a second order complementary filter in an inertial navigation system, the method comprising the steps of:
   a) blending a position signal from a first navigation source with a velocity signal from a second navigation source with blending filter;
   b) generating an output from the blending filter comprising a rate of change of position error of the first navigation source from the second navigation source;
   c) creating a position correction signal from the generated output; and
   d) applying the corrected signal to the inertial navigation system.

7. The method of claim 6 further comprising the step of continuously repeating steps a) through d).

8. The method of claim 6 further comprising the step of capturing a last value of position error when the first navigation source becomes invalid.

9. The method of claim 6 further comprising the step of switching the second order complimentary filter on when the first navigation source becomes invalid.

10. The method of claim 9 further comprising placing the second order complimentary filter on hold so that the generated output is constant.

11. A second order complementary filter for correcting position errors and velocity errors in an inertial navigation system (INS) comprising:
    a blending filter for blending a position signal from a first navigation source with an inertial navigation velocity signal from a second navigation source,
    a means for generating a dynamic error signal from said blending filter comprising a rate of change of position error of the first navigation source from the second navigation source;
    a means for disconnecting a position input and a position feedback from said blending filter when said input position signal becomes invalid;
    a means for summing said dynamic error signal and said inertial navigation system velocity signal to produce a dynamically corrected inertial navigation system velocity signal; and
    a means for integrating said inertial navigation velocity signal to produce a corrected inertial navigation system position signal.

12. The invention of claim 11 wherein said first navigation source comprises a global positioning system and said second navigation source comprises the INS.

13. The invention of claim 11 wherein said means for integrating is part of said second order complementary filter.

* * * * *